Nov. 28, 1933.  R. E. FLANDERS  1,936,756
HYDRAULIC SYSTEM AND MECHANISM THEREFOR
Filed July 15, 1930   5 Sheets-Sheet 5
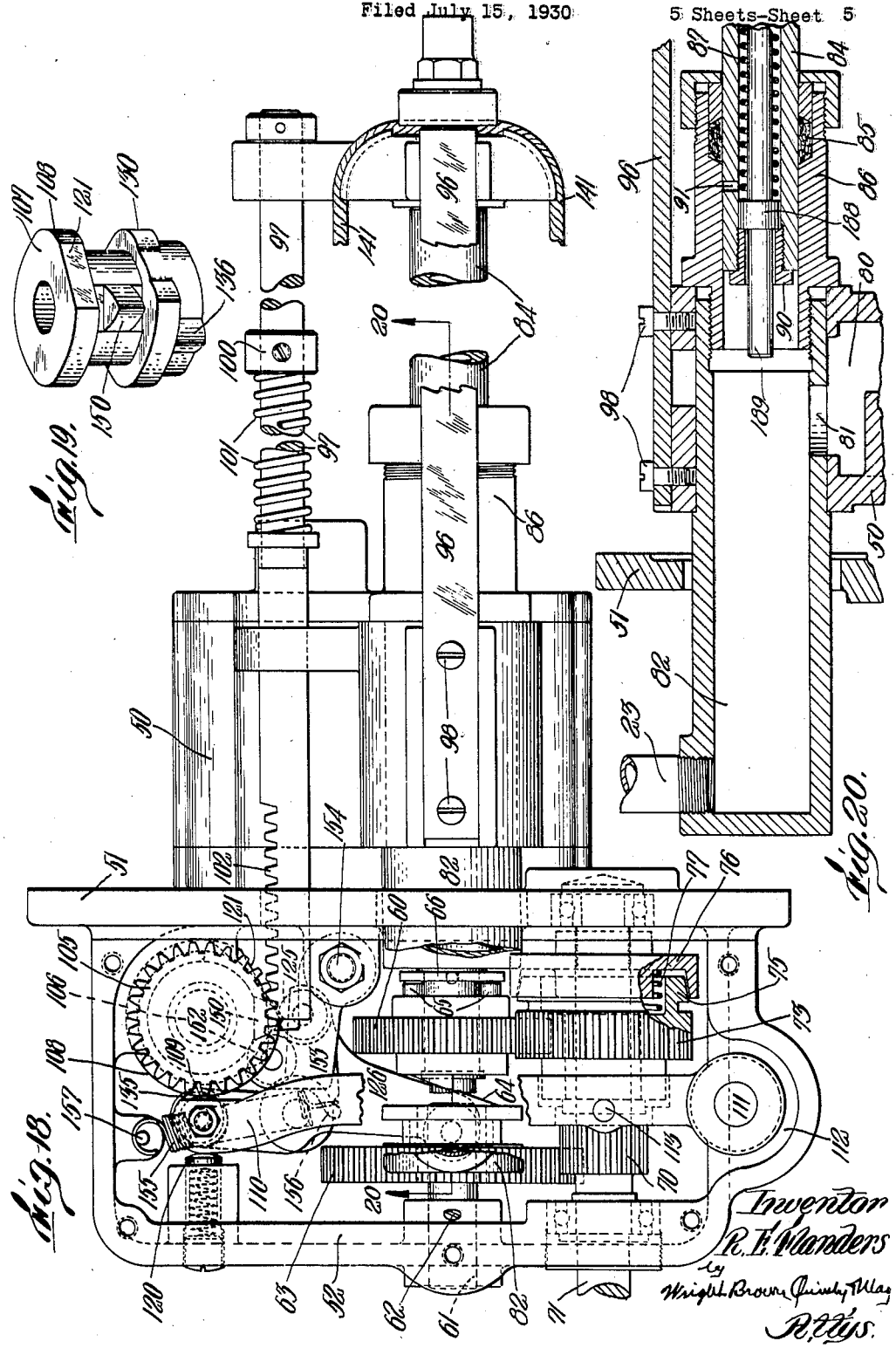

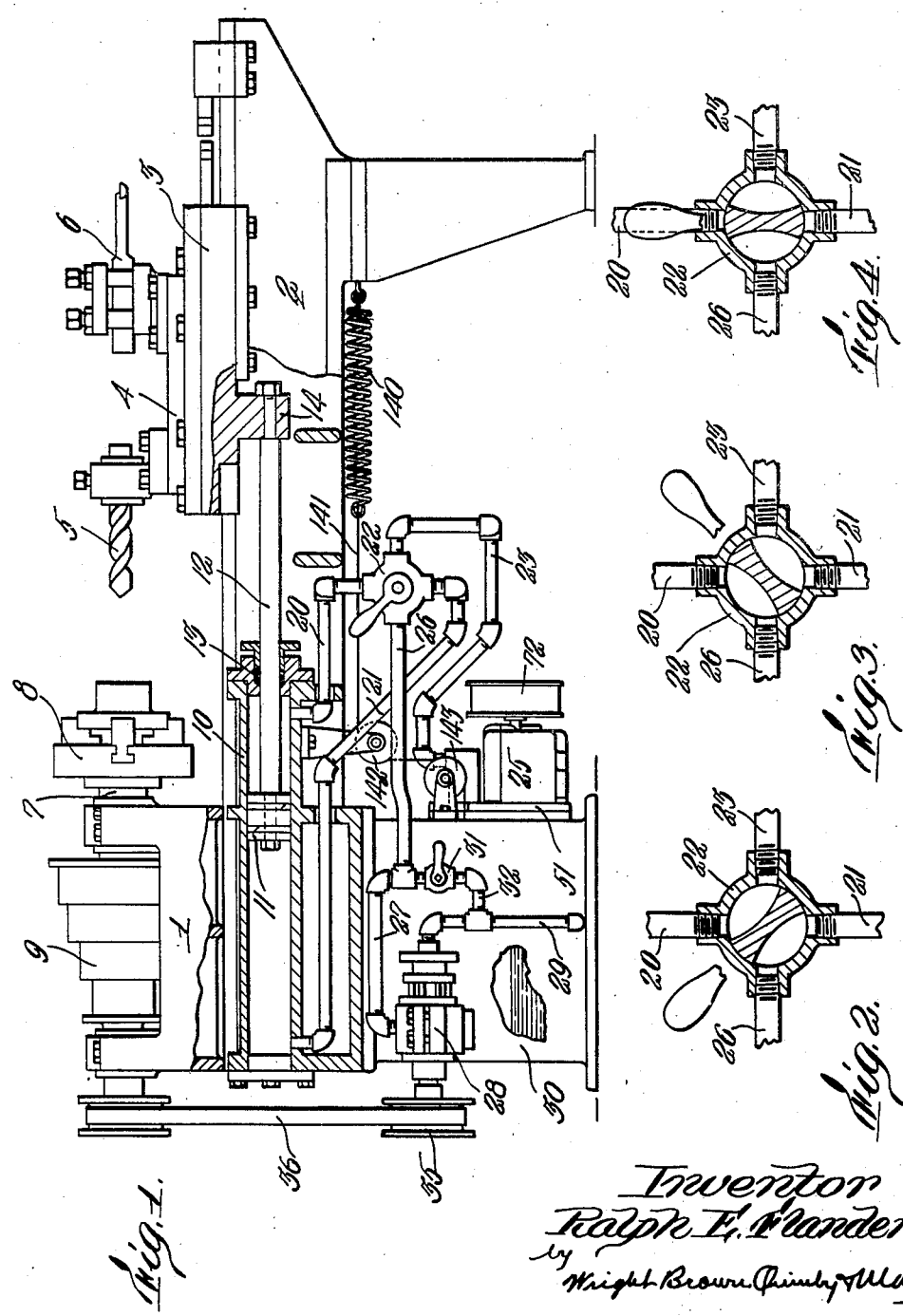

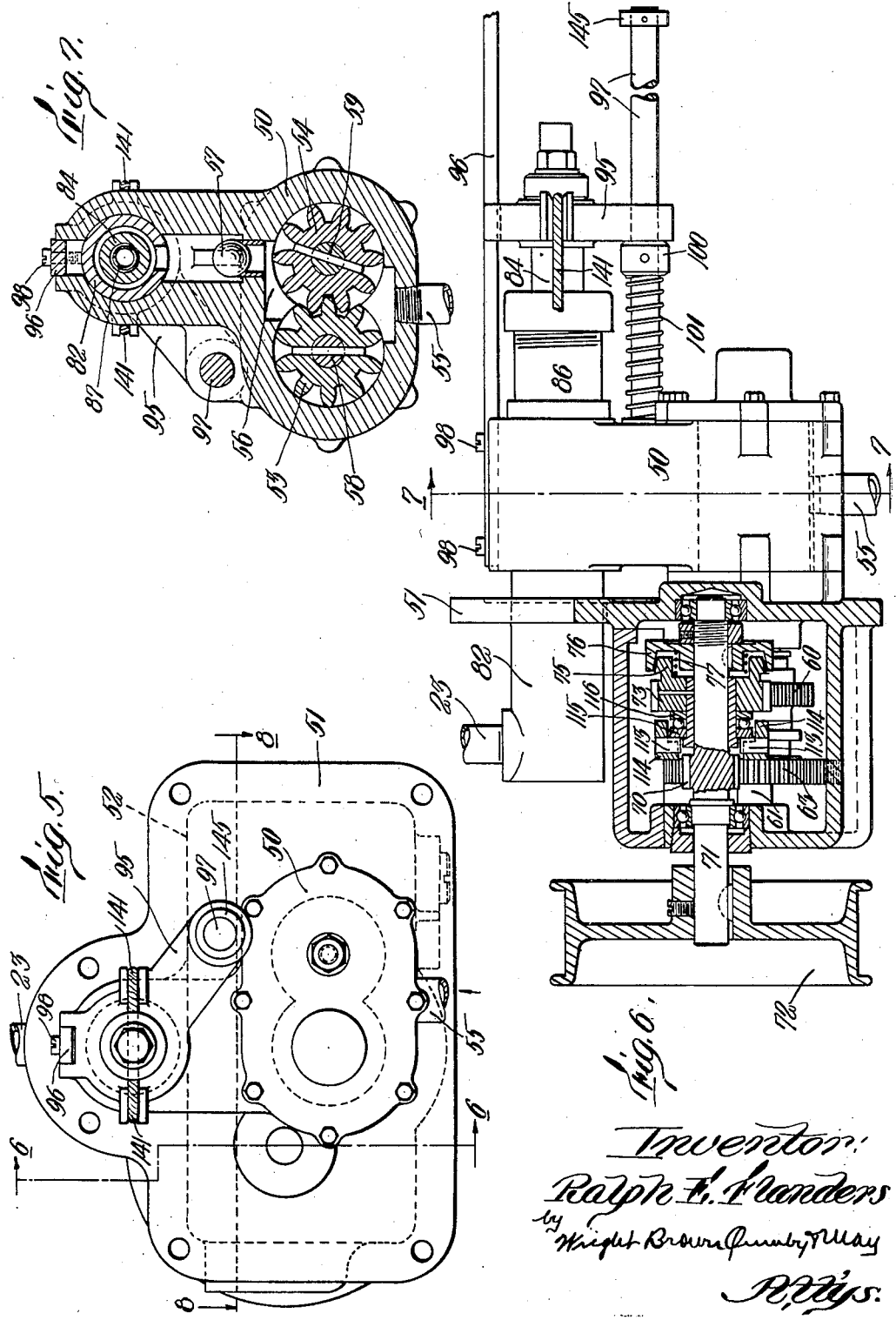

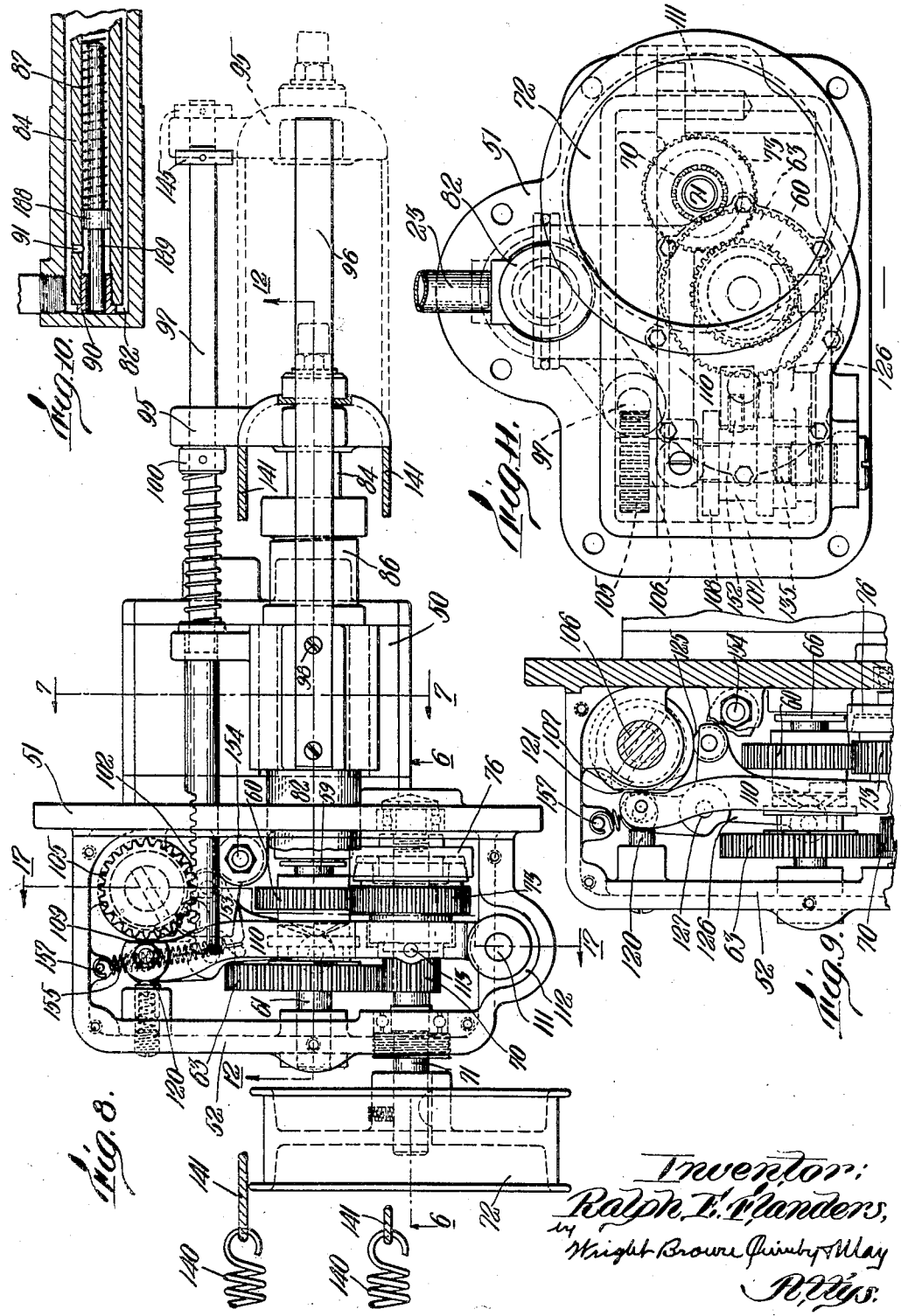

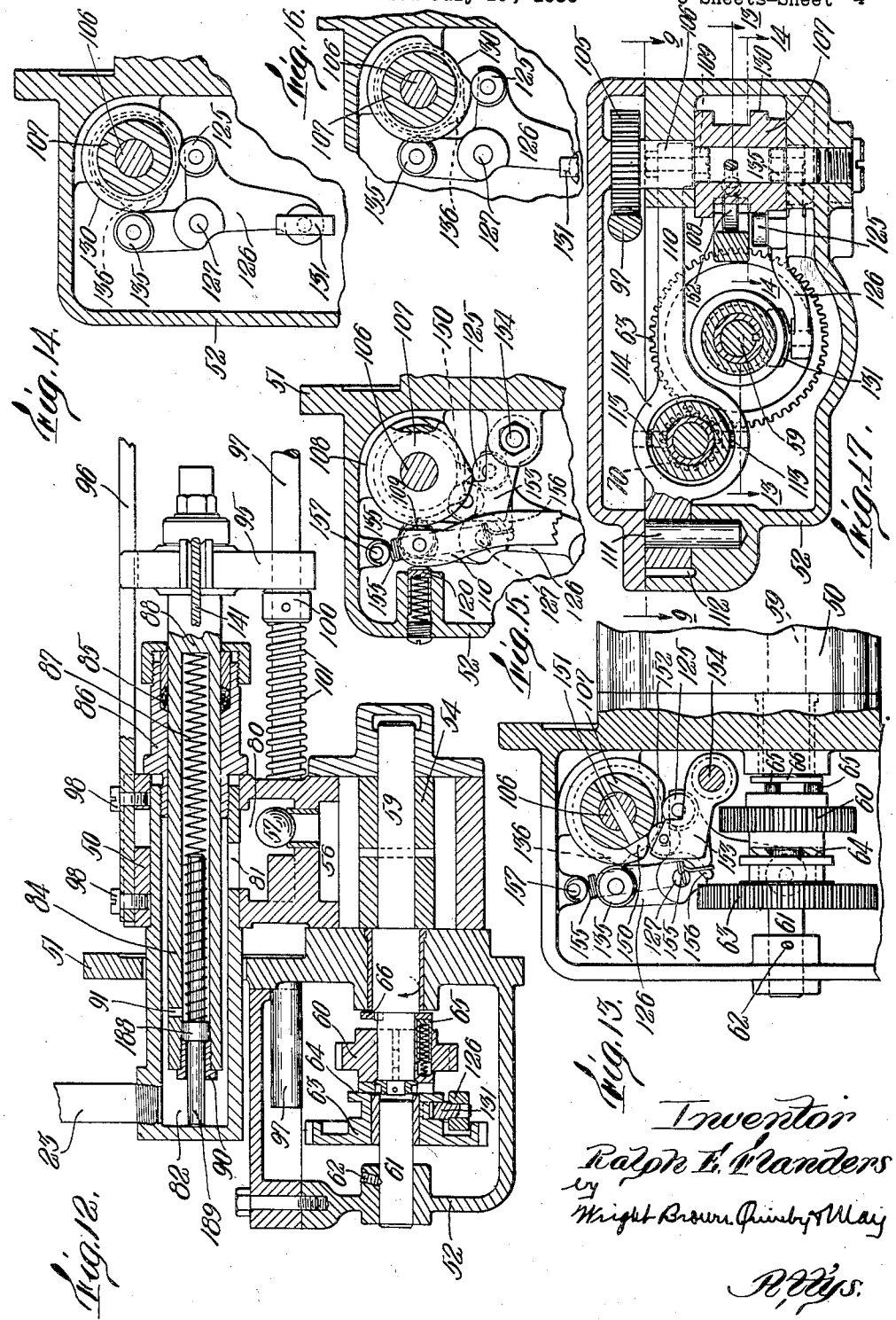

Patented Nov. 28, 1933

1,936,756

UNITED STATES PATENT OFFICE 1,936,756

HYDRAULIC SYSTEM AND MECHANISM THEREFOR

Ralph E. Flanders, Springfield, Vt., assignor to Jones & Lamson Machine Company, Springfield, Vt., a corporation of Vermont Application July 15, 1930. Serial No. 468,188

26 Claims. (Cl. 29—42)

This invention relates to hydraulic systems suitable, for example, for use in machine tools as for effecting traverse of a tool carriage. In the Hartness Patent No. 637,461 is shown and described a hydraulic feed in which a tool slide is traversed by hydraulic mechanism, liquid under pressure being employed to move the slide in one direction and a compressed gas, such as compressed air, being employed to drive the slide in the opposite direction. In the liquid pressure portion may be interposed a device for regulating the speed of motion of the slide. This is preferably a liquid metering device since such a device acts independently of the presence of the liquid. As pointed out in my application for patent Serial No. 368,306, filed June 4, 1929, for Hydraulically operated feed mechanism for speed machines, there is considerable advantage in controlling the rate of motion of a member such as a tool by causing the liquid as it is exhausted from the moving mechanism to pass through the meter rather than to pass it through the meter on its way to the mechanism, and in order that the full advantage of this arrangement may be realized in both directions of traverse, in accordance with the present invention liquid is used for the driving force for both directions of motions, the liquid exhausted in either case being passed at will through the metering device or being by-passed about this device. In order to supply liquid under pressure to the hydraulic motor properly controlled for such a system, in accordance with this invention, a pump is employed having a delivery automatically controlled by the pressure on the delivery side so that the volume is regulated in accordance with the resistance encountered to movement of the driven mechanism. This invention relates further, therefore, to a pump of this type provided with means controlled by the rate of use of the liquid by the driven mechanism and the delivery pressure to vary its driven speed.

For a more complete understanding of this invention, reference may be had to the accompanying drawings in which Figure 1 is a diagrammatic view partly in elevation and partly in vertical section showing the hydraulic system as applied to a turret lathe for traversing the turret.

Figures 2, 3 and 4 are cross sections through a control valve showing the parts in different positions.

Figure 5 is an end elevation of the pump and control mechanism.

Figure 6 is a section on line 6—6 of Figures 5 and 8.

Figure 7 is a section on line 7—7 of Figures 6 and 8.

Figure 8 is a section on line 8—8 of Figure 5, the parts being shown in fast motion position.

Figure 9 is a section on line 9—9 of Figure 17.

Figure 10 is a fragmentary longitudinal section through an accumulator with the parts in position for fast motion of the pump.

Figure 11 is an end elevation of the pump mechanism looking in the opposite direction from Figure 5.

Figure 12 is a section on line 12—12 of Figure 8.

Figures 13 and 14 are fragmentary sections on the correspondingly numbered section lines on Figure 17, the parts being shown in slow motion pumping position.

Figures 15 and 16 are fragmentary views similar to portions of Figures 13 and 14, respectively, but showing the parts in pump-stopped position, the liquid supply being derived from the accumulator.

Figure 17 is a section on line 17—17 of Figure 8.

Figure 18 is a view similar to a portion of Figure 8, but with parts broken away and showing pump-stopped positions as in Figures 15 and 16.

Figure 19 is a perspective of a cam.

Figure 20 is a section through the accumulator on line 20—20 of Figure 18.

Referring first to Figure 1 showing the subject matter of this invention as applied to a turret lathe, at 1 is indicated the headstock of a lathe which is mounted on a bed 2 and at 3 is shown the turret base which is slidable on the bed 1 toward and from the headstock and carries the turret 4 rotatable on a vertical axis and carrying the several tools such as 5 and 6, any of which may be presented selectively into operative position to the work. At 7 is shown the work spindle to which is attached a work holding device 8 and which is provided with suitable driving mechanism such as the cone pulley 9. The turret base 3, which is the tool slide, is arranged to receive its sliding motions by the hydraulic motor which comprises a cylinder 10 having a piston 11 therein defining with the cylinder a pair of expansible and contractible chambers on opposite sides of the piston. As shown the cylinder 10 is fixed to the bed 2 and the piston 11 is connected through the piston rod 12 which extends through a stuffing box 13 in one end of the cylinder to a portion 14 of the turret slide to which it is securely attached. Leading from opposite end portions of the cylinder 10 are the pipes 20 and 21 connected to the four way valve 22. At 23 is shown a pipe extending to the inlet of the valve from a suitable pumping mechanism shown generally at 25. The exhaust from the valve 22 passes through a pipe 26 and from this pipe it may pass through a pipe 27 to a metering device at 28 and from this metering device through a pipe 29 to a storage tank 30, or it may be by-passed about the metering device 28 through a pipe 32 having a valve 31 to the pipe 29.

The metering device may be of any suitable type such as is illustrated, for example, in the Hartness Patents Nos. 637,461 and 739,866, but as shown is of the type illustrated in my patent application Serial No. 398,693, filed October 10, 1929, for Metering device. The metering device of whatever type used is provided with a driving pulley 35 shown as connected by a belt 36 to the spindle 7. The rate at which liquid may flow through this metering device is dependent on the rate of rotation of the wheel 35 and as this is shown as connected to the spindle 7 the maximum rate of travel of the turret slide 3 is dependent on the rate of rotation of the spindle 7 when the metering device is interposed in the exhaust from the valve 22 and is independent of the pressure of the liquid.

When the valve 22 is in the position shown in Figures 1 and 2 and the pumping mechanism 25 is in operation, liquid under pressure passes from the pipe 23 through the valve 22 and the pipe 20 into the right hand end of the cylinder 10, as shown in Figure 1, thus to move the slide 3 toward the headstock of the machine, liquid exhausting from the left hand side of the piston 11 through the pipes 21 and 26. When the tool such as 5 is being brought up to the work, the valve 31 is positioned to by-pass the meter 28 so that the tool is moved rapidly up toward the work. As it approaches the work the valve 31 is thrown to shut off the by-pass and cause the exhaust to pass through the metering device 28, whereupon a resistance to the free exhaust of liquid from the left hand side of the piston 11 is interposed which limits the speed of the tool to the desired feed speed, and which, as before noted, is dependent upon the rate of rotation of the spindle 7.

When the tool has completed its traverse in this direction and it is desired to retract it from the work, the valve 22 is turned to the position shown in Figure 3 and the valve 31 is thrown to by-pass the metering device 28. In this position of the valve 22, shown in Figure 3, the pipe 20 leading from the right hand end of the cylinder is open to communicate with the exhaust pipe 26 and liquid under pressure passes from the pipe 23 through the pipe 21 into the left hand end of the cylinder 10, whereupon the tool is moved quickly to its retracted position. When it is desired to stop all traversing motion of the tool slide, the valve 22 is placed in the intermediate position, as shown in Figure 4, in which the supply pipe 23 and the exhaust pipe 26 are out of communication with both of the pipes 20 and 21 and the tool slide is held against movement.

In order that the fluid under pressure delivered to the valve 22 may be supplied at proper pressure to produce the desired movements, the pressure being prevented from rising too high or from falling too low, a pump which may have its rate of discharge controlled in accordance with the resistance encountered or the rate at which the fluid can be received by the actuated mechanism should be used and such a pump in which the rate of discharge is controlled by the pressure on the discharge side of the pump meets this requirement. The mechanism 25 is therefore of this general type and may be of the construction shown in Figures 5 to 20.

This pump as shown comprises a casing 50 having at one end a plate portion 51 which may be secured in one wall of the tank 30 to close off a suitable opening therein so that the pump portion 50 may be positioned within the tank, a gear box 52 being positioned outwardly thereof. As shown best in Figure 7 the casing 50 may have positioned therein intermeshing pump gears 53 and 54 which form the pumping elements. At 55 is shown a supply pipe leading into the lower portion of the tank 30 beneath the level of liquid therein and at 56 is shown a discharge port provided with a ball check valve 57. The gears 53 and 54 are fixed to suitable shafts 58 and 59, the shaft 59 being shown as the driving shaft through which rotary motion is imparted to the pump gears in order to produce their pumping action. The shaft 59 extends into the casing 52, as shown in Figure 12, and has slidably keyed thereon a small gear 60. In axial alinement with the shaft 59 is a stub shaft 61 fixed to the outer end of the casing 52, as by means of a set screw 62. On this shaft 61 is rotatable a larger gear 63 having integral therewith on its end facing the gear 60 a clutch face 64 which may mesh with a mating clutch element on the gear 60. The gear 60 is normally pressed toward the shaft 61 as by means of spring plungers 65 therein riding against a collar 66 fixed to the shaft 59 which permits this gear 60 to yield when the gear 63 is moved toward clutching position when the clutch elements are incorrectly angularly related for engagement, permitting the parts to mesh thereafter when they come into proper angular relation. Meshing with the gear 63 is a gear 70 on a drive shaft 71 extending outwardly of the casing head and having fixed thereto a drive pulley 72 (see Figure 8). Journaled on this shaft 71 is a large gear 73 which meshes with the gear 60 fixed to the shaft 59. This gear 73 is movable axially of the shaft 71 and has integral therewith a friction cone portion 75 which may frictionally contact a mating member 76 keyed to the shaft 71. A spring 77 normally holds these friction members apart by sliding the gear 73 to the left, as shown in Figure 18. By moving this gear 73 to the right, however, this gear may be made to rotate with the shaft 71, thus to drive the pump shaft 59 through its meshing gear 60. When the friction clutch is in clutched position the shaft 59 may be driven at a higher rate of speed through the intermeshing gears 73 and 61 than when the gear 63 is moved over into clutching relation to the shaft 59 and the friction clutch is inoperative. Means responsive to the liquid pressure at the delivery side of the pump is employed to control these gear connections between the drive shaft and the pump shaft so that when the delivery pressure is low, the high speed drive between the gear 73 and 60 is employed, when the pressure is higher, the low speed drive between the gears 70 and 63 is in operation, and when the delivery pressure is still higher or delivery throttled both drives are rendered inoperative. This mechanism will now be described.

The pump discharges past the check valve 57, heretofore described, into a chamber 80 (see Figure 12), which is in communication through a port 81 with a cylinder 82 forming a part of a hydraulic accumulator. The pipe 23 leading to the valve 22 opens into one end portion of this cylinder 82. Within the cylinder is slidable a ram or plunger 84 which passes through a stuffing box 85 at the opposite end of the cylinder from the pipe 23. The stuffing box 85 is formed in a plug member 86 threaded into the cylinder 82 and provided with an opening for the passage of the plunger 84. The plunger 84 thus is of somewhat smaller diameter than the bore of the cylinder 82 and is hollow to form a housing for a spring 87 which bears at one end against a solid portion 88 of the plunger and at the other against an enlarged diameter collar portion 188 of a pin 189 which is projected by this spring 87 until the collar portion 188 contacts with a stop 90 threaded into the end of the plunger. A port 91 permits the liquid under pressure to enter the hollow portion 87 thus to balance the pressure exerted by the liquid at opposite ends of the pin 189. Beyond the stuffing box 85 the plunger is fixed to a crosshead 95 slidably guided by guide members 96 and 97. The guide member 96 is fixed to the casing 50 immovably as by the screws 98. The guide member 97 is slidable and has fixed thereto a collar 100 with which the crosshead 95 may contact, this collar being pinned to the member 97. Between the collar 100 and the side wall of the casing 50, this member 97 is surrounded by a compression spring 101 which tends to keep the member 97 moved to the right sufficiently to relieve the tension on the spring. This member 97 is formed as a bar having rack teeth as at 102 at its inner end which mesh with a gear 105 (see Figures 8 and 17) fixed to or integral with a shaft 106 extending transversely within the housing 52. This shaft 106 carries a cam member 107 shown detached in Figure 19 so that as the rod 97 is moved axially the shaft 106 is rocked and a corresponding motion is imparted to the cam member 107. This cam member 107 has an edge cam portion 108 with which cooperates a follower roll 109 on a long lever 110 which is fulcrumed at 111 in a depression 112 in one wall of the housing 52. Intermediate its ends this member 110 is provided with a pair of inwardly projecting pins 113 in a yoke portion 114 which surrounds the pump drive shaft 71. The pins 113 bear on the outer raceway 115 (see Figure 6) of a ball bearing, the opposite raceway member 116 of which bears against the outer face of the gear 73. The arm 110 is held with its follower roll 109 pressed against the edge cam 108 as by a spring pressed plug 120 bearing on its outer face and when a flat portion 121 on the cam 107 is presented opposite to the follower roll, the lever 110 is rocked to the position shown in Figure 9 wherein the gear 73 is driven through the friction clutch members and drives the pump shaft 59. At the same time that these friction clutch members are engaged, a follower 125 on a lever 126 fulcrumed at 127 is pressed outwardly from the shaft 106 by an edge cam 130 so that a clutch ring shoe 131 carried at the opposite end of the lever 126 holds the gear 63 with its clutch face out of engagement with the clutch face on the gear 60. This represents the high speed drive of the parts, the gears 73 and 60 being the high speed driving connection. When the flat spot 121 is out of engaging position with its cam follower roll, the larger diameter portion of this edge cam 108 holds the end of the lever 110 outwardly from the shaft 106, thus disconnecting the frictional drive between the cone friction clutch members; and in one angular position of the cam member 107 while the friction clutch members are held out of engagement, a cam follower 135 bears on a hump 136 of the cam 107 and holds the lever 126 in a position where the gear 63 is clutched to the gear 60, as shown in Figure 12, whereupon the drive shaft 71 drives the pump shaft through the gears 70 and 63, this being the low speed position. The lever 126 is shown in this position in Figure 14.

There is also another position of the cam element 106 in which the arm 110 is in unclutched position and also the lever 126 is in unclutched position, as shown in Figures 15 and 16. In this position of the parts the drive shaft is entirely disconnected from the pump shaft and thus there is no pumping of liquid.

When the valve 22 is turned, as shown in Figure 2, to admit liquid under pressure to the right hand side of the piston to move the tool up to the work at high speed, the delivery pressure of the pump is suddenly reduced so that the plunger 84 is driven to its extreme inward position, as shown in Figure 10, the pin 189 contacting with the end of the cylinder 82 and compressing the spring 87, this being accomplished by means of a loading device which as shown consists of a spring at 140 which is connected as by means of cables 141 passing about suitable sheaves 142 and 143 (see Figure 1) to the crosshead 95. The loading of the accumulator is preferably done by means of springs, as shown, since springs present no inertia forces such as would be presented by the use of weights and by using a long spring a considerable range of motion with small actual pressure differences may be had. The pump drive shaft being in operation, it is then connected for high speed pumping through the friction clutch and the gears 60 and 73, as shown in Figure 9.

When the meter 28 is interposed in the exhaust from the cylinder 10 the motion of the tool slide is immediately reduced to working speed with a corresponding reduction in the rate of use of the liquid by the hydraulic motor which imposes a resistance to the flow of liquid and thus raises the delivery pressure at the pump. This causes the pressure acting on the end of the plunger 84 to move the crosshead 95 toward the right as viewed in Figures 6, 8 and 12 until it reaches the position shown in Figure 12 where the pin 189 has reached its limit of motion under the action of the spring 87. The spring 101 has caused the guide bar 97 to follow the motion of the crosshead so as to rotate the cam to the position shown in Figures 8 and 14 in which the friction drive has been disconnected and the drive between the gears 70 and 63 has become operative. Thus the pump is now driven at a slower speed. Should the delivery continue to be choked, whether by the continued interposition of the meter, by turret slide 3 striking a positive stop, or by excessive resistance imposed by the work to the further passage of the tool, the plunger is moved further to the right by the continued supply of liquid from the pump until it contacts with a collar 145, whereupon further motion of the plunger in the same direction moves the bar 97 further to the right and turns the cam member 107 to such a position that both drives are rendered inoperative so that the pump ceases to operate. This is the position shown in Figures 16 and 17. The accumulator then serves to supply liquid under pressure until such time as the gradual leakage or use permits the loading springs to pull the crosshead 95 back into contact with the collar 100, whereupon further inward motion acting against this collar moves the crosshead 95 to the left and puts the low speed driving connection into operation; or, as in Figures 8 and 14 on more complete release of pressure, it is moved sufficiently far to the left to begin to compress the spring 101 to render the fast motion mechanism operative. The spring 87 insures a positive division between the range of low pressure and the range of high pressure which are spaced by a pressure differential. The presence of liquid pumped is opposed by the pressure of the loading mechanism diminished by the pressure exerted by this spring 87 in the low pressure range from the position of the accumulator ram shown in Figure 10 to its position shown in Figure 12, while within the high pressure range with the ram from the position shown in Figure 12 to the extreme position shown in Figure 20, the spring 87 is ineffective, the liquid being under sufficient pressure to balance the entire loading pressure.

It is desirable that the transition from high speed to low speed be made at a pressure somewhat higher than the transition from low speed to high speed on the return stroke of the accumulator ram in order to prevent hunting of the driving connections at what might be termed a "critical" speed. For this reason what may be termed a "load and fire mechanism" has been illustrated which causes the transition from one to the other driving connection to be made suddenly after a predetermined pressure in the desired direction on the bar 97 has been exerted. This mechanism comprises a cam element 150 on the cam member 107, which, as shown best in Figure 13, may be formed as the head of a pin 151 by which the cam member 107 is fixed to the shaft 106. This acts upon a cam follower roll 152 carried by a lever 153 fulcrumed at 154 in the casing 52. The cam roll 152 is normally pressed against the cam in the plane of the head 150 by means of a loading spring 155 which is passed about an ear 156 on this arm at one end and engages on a stationary pin 157 on the casing 52 at its other end. By this means the cam 107 is held in position with the roll 152 bearing on one or the other side of the head 150 until sufficient pressure is exerted tending to turn this cam to overcome the spring 155 and permit the head 150 to snap past the roll.

It will thus be seen that a variable delivery pump has been provided driven by gearing at either of two speeds or stopped entirely, depending on the pressure exerted on the delivery side of the pump, which pressure is dependent on the resistance imposed to the movement of the mechanism hydraulically actuated, the stopping of the pump depending primarily on the amount of liquid available under the relatively high pressure for actuating the motor rather than on any substantial increase of pressure, the use of long loading springs preventing any large actual pressure differences within the high pressure range, as hereinbefore noted.

From the foregoing description of an embodiment of this invention, it should be evident to those skilled in the art that various changes and modifications might be made without departing from the spirit or scope of this invention as defined by the appended claims.

I claim:

1. In a fluid pressure system, a pair of expansible and contractible chambers, means actuable to admit fluid under pressure to either selected one of said chambers to expand the same while exhausting fluid from the other of said chambers, means for regulating the rate of expansion and contraction of said chambers irrespective of the pressure of said fluid, a variable capacity pumping mechanism for supplying fluid under pressure to said admitting means, and means controlled by the pressure on the delivery side of said mechanism for regulating said capacity.

2. In a fluid pressure system, a pair of expansible and contractible chambers, means actuable to admit fluid under pressure to either selected one of said chambers to expand the same while exhausting fluid from the other of said chambers, means for regulating the rate of expansion and contraction of said chambers irrespective of the pressure of said fluid, a variable capacity pumping mechanism for supplying fluid under pressure to said admitting means, and means controlled by said rate for regulating said capacity.

3. In a fluid pressure system, a cylinder, a piston in said cylinder, means for admitting fluid under pressure to either end of said cylinder and for exhausting fluid from the opposite end of said cylinder, means for controlling the rate of such exhaust independent of the pressure of said fluid to thereby control the speed of motion of said piston, a pump for supplying fluid under pressure to said admitting means, variable speed means for driving said pump, and means responsive to the rate of use of the fluid on the delivery side of said pump for controlling said variable speed means.

4. In a fluid pressure system, a cylinder, a piston in said cylinder, a valve for directing liquid under pressure to either end of said cylinder while exhausting liquid from the opposite end of said cylinder, a liquid metering device interposable in the exhaust from said valve, a liquid storage tank into which the exhaust liquid flows, a variable delivery pump for delivering liquid under pressure from said tank to said valve, and means responsive to the rate of use of liquid on the delivery side of said pump for controlling the delivery rate of said pump.

5. In a fluid pressure system, a cylinder, a piston in said cylinder, a valve for directing liquid under pressure to either end of said cylinder while exhausting liquid from the opposite end of said cylinder, a liquid metering device interposable in the exhaust from said valve, a liquid storage tank into which the exhaust liquid flows, a pump for delivering liquid under pressure from said tank to said valve at any of a plurality of different rates, and an accumulator responsive to the rate of use of liquid on the discharge side of said pump for determining at which of said rates said pump delivers.

6. In a fluid pressure system, a cylinder, a piston in said cylinder, a valve for directing liquid under pressure to either end of said cylinder while exhausting liquid from the opposite end of said cylinder, a liquid storage tank into which the exhaust liquid flows, a pump for delivering liquid under pressure to said valve, means including a relatively high speed and a relatively low speed mechanism for actuating said pump, and an accumulator responsive to the pressure of liquid on the delivery side of said pump for causing said high speed mechanism only to be operative at low delivery pressure, said low speed mechanism only to be operative at higher delivery pressure, and for causing both of said mechanisms to be inoperative when said accumulator is full.

7. In combination, a pump, a pump shaft, a drive shaft, selective high and low speed connections between said drive and pump shafts, an accumulator subject to fluid pressure on the discharge side of said pump, and means controlled by said accumulator for rendering operative said high speed connection on relatively low discharge pressure and for rendering operative said low speed connection on relatively higher discharge pressure.

8. In combination, a pump, a pump shaft, a drive shaft, selective high and low speed connections between said drive and pump shafts, an accumulator subject to fluid pressure on the discharge side of said pump, and means controlled by said accumulator for rendering operative said high speed connection on relatively low discharge pressure and for rendering operative said low speed connection on relatively higher discharge pressure and for causing both connections to be inoperative when the accumulator is full.

9. In combination, a pump, a rotary pump shaft for actuating said pump, a drive shaft, selectively operative high and low speed connections between said shafts, a cam member having cams for controlling said high and low speed connections, and an accumulator subject to fluid pressure on the delivery side of said pump and having a plunger loaded to be responsive in its position to the amount of such pressure, and connections from said plunger for controlling the position of said cam member.

10. In combination, a pump, a rotary pump shaft for actuating said pump, a drive shaft, selectively operative high and low speed connections between said shafts, a cam member having cams for controlling said high and low speed connections, and an accumulator subject to fluid pressure on the delivery side of said pump and having a plunger loaded to be responsive in its position to the amount of such pressure, and connections from said plunger for controlling the position of said cam member, said connections including a yielding element and means tending to hold said cam against movement from certain positions until said yielding element has been stressed to a predetermined amount.

11. In combination, a pump, a rotary pump shaft for actuating said pump, a drive shaft, selectively operative high and low speed connections between said shafts, and means responsive to pressure on the delivery side of said pump for maintaining said high speed connection operative on increase of delivery pressure to a predetermined point, to maintain said low speed connection effective on delivery pressure above said point and to render said high speed connections again operative only on reduction of pressure to a point below said point.

12. In combination, a pump, a rotary pump shaft for actuating said pump, a drive shaft, selectively operative high and low speed connections between said shafts, and means responsive to pressure on the delivery side of said pump for maintaining said high speed connection operative on increase of delivery pressure to a predetermined point, to maintain said low speed connection effective on delivery pressure above said point to maintain both connections inoperative when the accumulator is full and to render said high speed connections again operative only on reduction of pressure to a point below said high point.

13. A machine having a rotary spindle, a device movable with reference to said spindle, a hydraulic motor for moving said device in opposite directions, a pump for delivering liquid under pressure to said motor for effecting such movements, means responsive to the resistance encountered by said member in its movements for regulating the rate of pumping, and a liquid metering device interposable in the exhaust from said motor and controlled by the speed of rotation of said spindle for regulating the speed of such movement in accordance with the speed of rotation of said shaft.

14. In combination, a fluid pressure operated mechanism, means for supplying fluid under pressure to said mechanism, a cylinder in communication with the fluid intake of said mechanism, a piston in said cylinder movable by pressure from said intake toward one end of said cylinder, yielding loading means for moving said piston in opposition to said pressure, and means responsive to the position of said piston in said cylinder for controlling the rate of supply of fluid to said mechanism from said supply means.

15. In combination, a fluid pressure operated mechanism, means for supplying fluid under pressure to said mechanism, a cylinder in communication with the fluid intake of said mechanism, a piston in said cylinder movable by pressure from said intake toward one end of said cylinder, yielding loading means for moving said piston in opposition to said pressure, means acting when said piston is in a position toward that end of the cylinder to which it is impelled by said loading means acting in opposition to but with less force than said loading means against movement of said piston further toward said end, and means responsive to the position of said piston in said cylinder for controlling the rate of supply of fluid to said mechanism from said supply means.

16. In combination, a fluid pressure operated mechanism, means for supplying fluid under pressure to said mechanism at either one of two different rates, and means responsive to the pressure of fluid supplied to said mechanism for determining at which rate said fluid is supplied, said responsive means including means for cutting in the low rate feed at a predetermined high pressure and for cutting out said low rate feed at a pressure substantially below said predetermined pressure.

17. In combination, a fluid pressure operated mechanism, means for supplying fluid under pressure to said mechanism at either one of two different rates, and means responsive to the pressure of fluid supplied to said mechanism for determining at which rate said fluid is supplied, said responsive means including means for cutting in the low rate feed at a predetermined high pressure and for cutting out said low rate feed and cutting in the high rate feed at a pressure substantially below said predetermined pressure.

18. In combination, a fluid pressure operated mechanism, means for supplying fluid under pressure to said mechanism at either one of two different rates, and means responsive to the pressure of fluid supplied to said mechanism for determining at which rate said fluid is supplied, said responsive means including means for cutting in the low rate feed at a predetermined high pressure and for cutting out said low rate feed and cutting in the high rate feed at a pressure substantially below said predetermined pressure and for cutting out both feeds substantially above said predetermined pressure.

19. In combination, a machine having a work support, a tool, means for imparting relative movement between said tool and support, and means responsive to the resistance imposed to such movement for determining which of a plurality of pressures differing from each other by a pressure differential will be exerted for its production.

20. In combination, a machine having a work support, a tool, means for feeding the tool relative to the work including a fluid pressure operated mechanism, means for supplying fluid to said mechanism at different rates and exhausting fluid from said mechanism, means actuable to limit the rate of exhaust from said mechanism to thereby control the rate of said feed movement, and mean responsive to such feed rate for controlling the rate of flow of fluid delivered to said mechanism by said supply means.

21. In combination, a lathe having a work spindle, a tool, fluid pressure means for moving said tool relative to work supported by said spindle, means interposable at will in the exhaust from such means for regulating the maximum rate of such exhaust in accordance with the speed of rotation of said work spindle, means for supplying fluid under pressure to said mechanism at either of a plurality of rates, and means responsive to the slowing of tool speed on the interposition of said regulating means to cause said supplying means to supply fluid at the slower rate, and responsive to the greater tool speed when said regulating means is inoperative, to cause said supply means to supply fluid at the greater rate.

22. In combination, a lathe having a work spindle, a tool, a cylinder, a piston in said cylinder, connections for causing relative movement of said piston and cylinder to move said tool, a liquid reservoir, means including fast and slow flow pumping means for supplying liquid under pressure to either end of said cylinder and releasing liquid in the other end of said cylinder to exhaust, a liquid metering device interposable at will in said exhaust and when interposed limiting the maximum rate of exhaust to a relative low speed dependent on the speed of rotation of said spindle and to thereby build up the pressure of liquid supplied by said pumping means, and means responsive to such increased pressure for causing said slow flow pumping means only to be operative to deliver liquid to said cylinder, said pressure responsive means acting to cause a fast rate of pumping on reduction of such pressure to a predetermined amount.

23. In combination, a lathe having a work spindle, a tool, a cylinder, a piston in said cylinder, connections for causing relative movement of said piston and cylinder to move said tool, a liquid reservoir, means including variable flow pumping means for supplying liquid under pressure to either end of said cylinder and releasing liquid in the other end of said cylinder to exhaust, a liquid metering device interposable at will in said exhaust and when interposed limiting the maximum rate of exhaust to a relatively low speed dependent on the speed of rotation of said spindle and to thereby build up the pressure of liquid supplied by said pumping means, and means including an accumulator responsive to such increased pressure for causing said pumping means to be operative to deliver liquid at a relatively slow rate to said cylinder, said pressure-responsive means acting to cause a fast rate of pumping on reduction of such pressure to a predetermined amount, and when said accumulator is full to render said pumping means inoperative to deliver liquid to said cylinder.

24. In combination, a lathe having a work spindle, a tool, a liquid pressure motor for relatively moving said tool and said work spindle, means including fast and slow pumping means for supplying liquid under pressure to said motor, a liquid metering device operatively related to said spindle and interposable at will in the discharge from said motor and when interposed limiting the maximum rate of discharge to a relatively low speed dependent on the speed of rotation of said spindle, and to thereby build up the pressure of liquid supplied by said pumping means, and means responsive to such increased pressure for causing said slow flow pumping means only to be operative to deliver liquid to said motor, said pressure-responsive means acting to cause a fast rate of pumping on reduction of such pressure to a predetermined amount.

25. In combination, a lathe having a work spindle, a tool, a liquid pressure motor for relatively moving said tool and said work spindle, means including fast and slow pumping means for supplying liquid under pressure to said motor, a liquid metering device operatively related to said spindle and interposable at will in the discharge from said motor and when interposed limiting the maximum rate of discharge to a relatively low speed dependent on the speed of rotation of said spindle, and to thereby build up the pressure of liquid supplied by said pumping means, and means responsive to such increased pressure for causing said slow flow pumping means only to be operative to deliver liquid to said motor, said pressure-responsive means including an accumulator and acting to cause a fast rate of pumping on reduction of such pressure to a predetermined amount, and when said accumulator is full to render said pumping means inoperative to deliver liquid to said motor.

26. In combination, a fluid pressure operated mechanism, means for supplying fluid under pressure to said mechanism at either one of two different rates, means including an accumulator responsive to the pressure of fluid supplied to said mechanism for determining at which rate said fluid is supplied, said responsive means including means for cutting in the low rate of feed at a predetermined high pressure and for cutting out the low rate feed and for cutting in the high rate feed at a pressure substantially below said predetermined pressure, and for cutting out both feeds when said accumulator is full.

RALPH E. FLANDERS.